United States Patent
Holmring

(10) Patent No.: US 6,216,002 B1
(45) Date of Patent: Apr. 10, 2001

(54) METHOD FOR SELECTING BASE TRANSCEIVER STATIONS FOR GATHERING DATA TO DETERMINE A MOBILE STATION'S LOCATION IN A WIRELESS NETWORK

(75) Inventor: Anders T. Holmring, Stockholm (SE)

(73) Assignee: Ericsson Inc., RTP, NC (US)

( * ) Notice: Subject to any disclaimer, the term of this patent is extended or adjusted under 35 U.S.C. 154(b) by 0 days.

(21) Appl. No.: 09/075,579

(22) Filed: May 11, 1998

(51) Int. Cl.[7] .............................. H04Q 7/20; H04M 15/00
(52) U.S. Cl. .......................... 455/436; 455/440; 379/118
(58) Field of Search .................................. 455/440, 436, 455/426, 444, 456, 435; 379/115, 118

(56) References Cited

U.S. PATENT DOCUMENTS

| | | | |
|---|---|---|---|
| 5,428,816 | * 6/1995 | Barnett et al. | 455/33.2 |
| 5,613,205 | 3/1997 | Dufour . | |
| 5,722,043 | * 2/1998 | Rappaport et al. | 455/33.1 |
| 5,905,950 | * 5/1999 | Anell | 455/421 |
| 5,933,787 | * 8/1999 | Gilhousen et al. | 455/562 |
| 5,960,347 | * 9/1999 | Ozluturk | 455/442 |

FOREIGN PATENT DOCUMENTS

WO 97/27711    7/1997  (WO) .

OTHER PUBLICATIONS

Mouly, M. et al., *The Pseudo–Synchronisation, a Costless Feature to Obtain the Gains of a Synchronised Cellular Network*, MRC Mobile Radio Conference, Nov. 1991.

* cited by examiner

*Primary Examiner*—Fan Tsang
*Assistant Examiner*—Sheila Smith

(57) ABSTRACT

A method for selecting base transceiver stations to obtain radio signal timing data that is used to make a location determination of a mobile station in a wireless network. The mobile station's serving base transceiver station is selected. Base transceiver stations on the mobile station's handover candidate list that are connected to the same base station controller as the serving base station and not cosited with a previously selected base transceiver station are selected next. If a sufficient number of base transceiver stations has not been selected, base transceiver stations on a positioning neighbor list that are connected to the same base station controller as the serving base station and not cosited with a previously selected base station are selected.

2 Claims, 3 Drawing Sheets

METHOD FOR SELECTING BASE TRANSCEIVER STATIONS FOR GATHERING DATA TO DETERMINE A MOBILE STATION'S LOCATION IN A WIRELESS NETWORK

TECHNICAL FIELD OF THE INVENTION

This invention relates to determining the location of a mobile station in a wireless telecommunications network, and, more specifically, to a method for selecting base transceiver stations to gather signal timing data for making an accurate location determination.

BACKGROUND OF THE INVENTION

Several of telephony's features and services are based on the location of the telephone. For example, a public safety ("911") system directs aid to the caller at the location of the calling telephone. Such systems function without the caller having to identify the location (an important feature for people unfamiliar with the area or unable to speak to the public safety personnel). The location of a landline telephone is static; the location is simply the point where the telephone is connected to the network. Since the location is static, the location and the telephone number are therefore stored in a database for later use. In contrast, a mobile station by definition has a dynamic relationship with locations in its wireless network; therefore, determining its position is more difficult.

To locate a mobile station with a high degree of accuracy, measurements of the distances of the mobile station from at least three fixed points are needed. The distance measurements are used in a triangulation algorithm to calculate a location relative to the fixed points. In wireless networks based on the Global System for Mobile communication (GSM) standard, obtaining the distance measurement to make a location determination of a mobile station engaged in a call is relatively straightforward.

In a GSM wireless network, a mobile station's distance from fixed points is derived from the time the mobile station's radio signal takes to arrive at different base transceiver stations (BTS's). Since the locations of the BTS's are known, the location of the mobile station is calculated to a relatively high degree of accuracy. The time values are readily available because of the manner in which the GSM standard specifies multiplexing of mobile stations on a given radio frequency.

According to the GSM standard, a mobile station on a call shares a radio frequency with other mobile stations by broadcasting and receiving only within a time slot assigned by the serving BTS. Signal propagation delay generally causes the mobile station's broadcast to be received at the serving BTS after its assigned time slot. To synchronize the mobile station with the BTS, the serving BTS calculates and sends a "timing advance" (TA) value to each mobile station. The TA is the amount of time that the mobile station must broadcast in advance of its assigned time slot so that the BTS receives the transmission during the proper time slot. Thus the TA value is the difference between the time that the mobile station's signal is transmitted ant the time the signal actually arrives.

The TA value may be used to derive the distance between the BTS and the mobile station, because signal propagation delay is usually a function of distance. The speed of the radio signal (the speed of light) times the TA (propagation time) yields the distance between the BTS and the mobile station. The point where at least three distance measurements intersect is the point of transmission and thus the location of the mobile station. While this location determination procedure is well known, determining which BTS's to use to obtain the TA values from is sometimes not as simple.

One prior art method for selecting BTS's is to select the serving BTS first. Next, BTS's from the mobile station's handover candidate list are selected. A problem with this method, however, is that some of the candidate BTS's may be cosited, that is, located at or near the same location as the serving or a previously selected BTS, and thus unsuitable for position triangulation. Furthermore, BTS's on the handover candidate list that are connected to a different base station controller (BSC) than the serving BTS are unsuitable because using different BSC's requires an unacceptable increase in message traffic among the components of the wireless network. Therefore, it is difficult to find sufficient BTS's for gathering TA values to make a position determination of a mobile station when there are not enough suitable BTS's on the mobile station's handover candidate list.

SUMMARY OF THE INVENTION

A method according to this invention selects BTS's for gathering signal timing values by first selecting the serving BTS. Next, the handover candidate list is searched for one or more BTS's that are connected to the same BSC as the serving BTS and are not cosited with a previously selected BTS. If at least three BTS's cannot be selected in this manner, then a positioning neighbor list is searched to select a BTS near a BTS on the handover candidate list that is connected to the same BSC as the serving BTS.

For each BTS, there is a positioning neighbor list comprising nearby BTS's. BTS's on the positioning neighbor list that are not on the handover candidate list may not have adequate signal quality for the handover candidate list, but are able to make the timing advance (TA) measurement required for a location determination. Thus, if there is an insufficient number of BTS's on he handover candidate list that are connected to the same BSC as the serving BTS and not cosited with the serving BTS or a previously selected BTS, further BTS's may be selected from the positioning neighbor list.

BRIEF DESCRIPTION OF THE DRAWINGS

A more complete understanding of this method may be obtained from consideration of the following description taken in conjunction with the drawings, wherein.

DETAILED DESCRIPTION OF THE INVENTION

Figure 1:
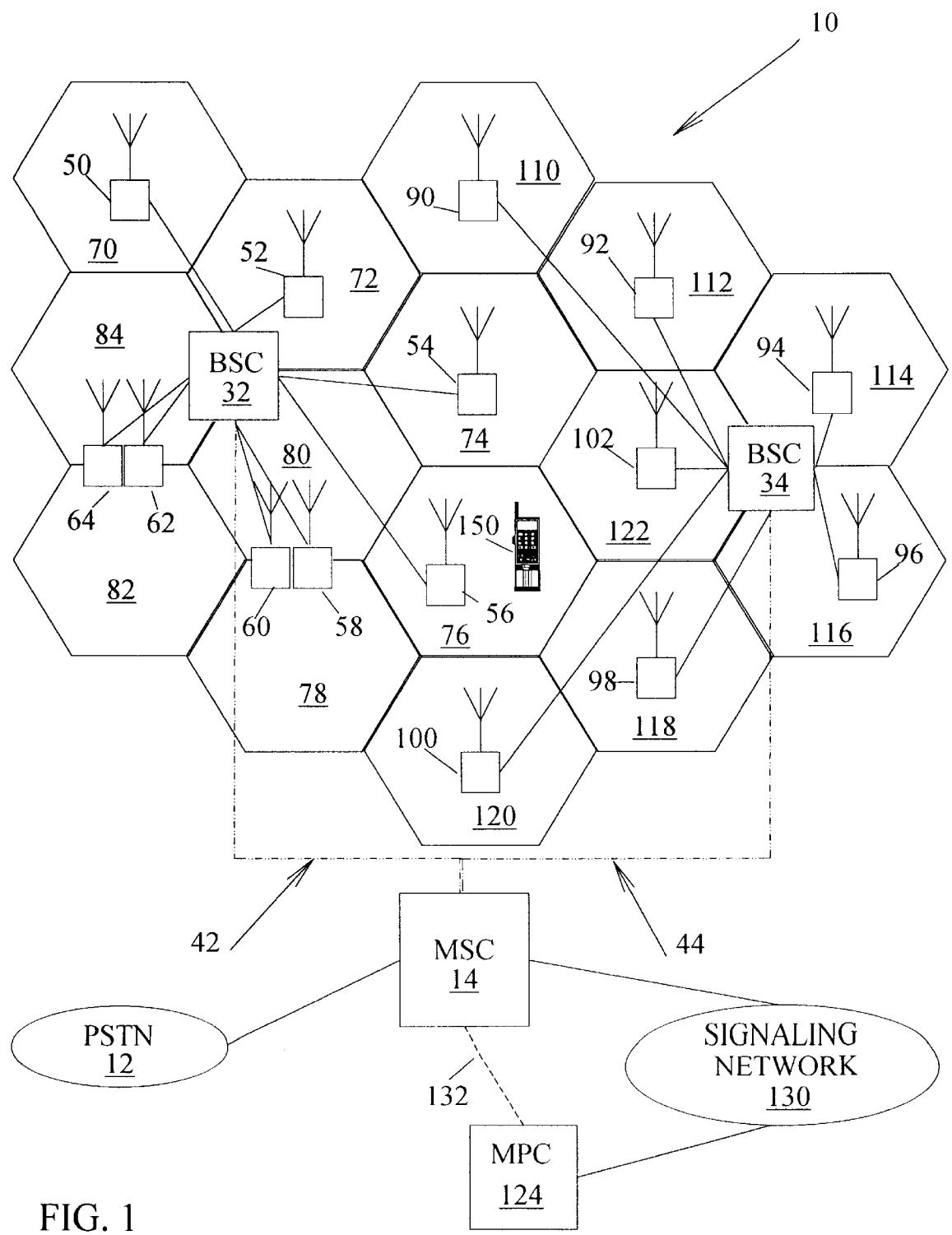
FIG. 1 is a block diagram of a wireless network wherein the method of selecting base transceiver stations to make distance measurements may be practiced.

This method will be described in the context of a GSM wireless system. However, this method may be practiced in other wireless formats (e.g., Code Division, Multiple Access and Time Division, Multiple Access). FIG. 1 illustrates a typical GSM wireless network in which a method for selecting base transceiver stations for obtaining radio signal timing measurements may be practiced. Wireless network 10 is connected to the public switched telephone network (PSTN) 12, which comprises a plurality of other wireless and landline networks. PSTN 12 is connected to wireless network 10 at a mobile switching center (MSC) 14.

In order to provide service throughout wireless network 10, MSC 14 is connected base station controllers (BSC's) 32 and 34 via trunks 42 and 44, respectively. BSC's 32 and 34 each manages a plurality of base transceiver stations (BTS's). In the illustration of FIG. 1, BSC 32 manages BTS's 50, 52, 54, 56, 58, 60, 62 and 64. Each BTS provides radio communications and radio communications control for all mobile stations in its respective coverage area ("cell") 70, 72, 74, 76, 78, 80, 82 and 84. All cells are shown in this figure as interlocking hexagons. In a typical wireless network, cells are irregularly shaped, overlapping areas, whose shape and coverage area depend upon the features of the terrain. BTS's 58 and 60 are cosited, meaning that they are located in the same place, due to terrain constraints, tall building, and/or zoning restrictions. BTS's have directional antennas cover their respective cells 78 and 80. BTS's 62 and 64 are similarly cosited.

BSC 34 coordinates BTS's 90, 92, 94, 96, 98, 100 and 102, which provide radio communications and radio communications control for mobile stations in cells 110, 112, 114, 116, 118 120 and 122, respectively.

Mobile station 150 is moving about in wireless network 10. In this illustration, mobile station 150 is located in cell 76, for which BTS 56 is the "serving" BTS; that is, mobile station 150 is in radio communication with and under the control of BTS 56. One of the communications control functions performed by a serving BTS is to cause mobile station 150 to develop a handover candidate list. When mobile station 150 is powered on in cell 74, or when mobile station 150 is handed over to BTS 56, the handover candidate list is initially empty. BSC 32 sends to mobile station 150, via BTS 56, identifications of BTS's from which mobile station 150 may receive radio signals. BTS's with signal quality above certain thresholds are placed on the handover candidate list, rank ordered from most suitable BTS (best quality signal measured by mobile station 150) to least suitable BTS (poorest quality signal, but still a potential handover candidate). Mobile station 150 periodically checks the signal quality of BTS's on the handover candidate list, updates it and reorders it according to the results of the measurements. In this example, the handover candidate list for mobile station 150 includes BTS's 56 (the serving BTS is normally on the handover candidate list), 102, 98, 100, 58 and 60. BTS 54 may not be on the handover candidate list because, for example, there may have been a mountain or a tall building between it and mobile station 150 when mobile station 150 performed its last list update.

In some wireless networks, a mobile positioning center (MPC) 124 determines the location of a mobile station relative to the wireless network, responsive to location requests (from a public safety system, for example). In FIG. 1, MPC 124 is connected to MSC 14 through a signaling network 130. Alternatively, MPC 124 may be directly connected to MSC 14, as shown by dashed line 132. MPC 124 has a record of the location of all BTS's within wireless network 10. MPC 124 derives the location of mobile station 150 by measuring the time that a radio signal from the mobile station takes to reach at least three BTS. To this end, MPC 124 requests the timing advance (TA) values from at least three BTS's to calculate the distances between mobile station 150 and the BTS's and also requests the identities of the BTS's from which the TA values were obtained. MPC 124 uses the geographical coordinates of the BTS's and the calculated distances between the mobile station and the BTS's to derive the location of the mobile station. An MPC is not necessary, however, to make use of my invention. Any entity that knows the location of the BTS's in the network can use this method to select BTS's to obtain timing values to make location determinations.

When MPC 124 (or other entity) requires the location of mobile station 150, it sends a request to MSC 14, which forwards the request to the BSC of the serving BTS. The BSC then collects TA values from at least three BTS's, but first the BTS's have to be selected. The serving BTS 56 is first selected. Next, the mobile station's handover candidate list is checked for appropriate BTS's (i.e., connected to the same BSC as the serving BTS and not cosited with a previously selected BTS). As stated above, the handover candidate list of mobile station 150 includes BTS's 56, 102, 98, 100, 58 and 60 ranked in that order. BTS 56 is already selected, so it is excluded. BTS's 102, 98 and 100 are not appropriate, because they are not connected to BSC 32 (the BSC of the serving BTS 56). BTS 58 is appropriate because it is connected to BSC 32 and is not cosited with BTS 56. BTS 60, the last BTS on the handover candidate list, is not appropriate. While BTS 60 is connected to BSC 32, it is cosited with a previously selected BTS (BTS 58). If BTS 60 were selected, the TA value would be virtually, if not exactly, identical to the TA value from BTS 58. Only two BTS's are selected at this point for obtaining TA values for determining the location of mobile station 150. However, as stated above, TA values from at least three BTS's are required for an accurate determination of the position of mobile station 150.

In accordance with this method for selecting BTS's, further BTS's are selected from a positioning neighbor list. The positioning neighbor list is compiled by the wireless network's operating company. For each BTS connected to a selected BSC, the operating company selects BTS's that are nearby. Each nearby BTS is not necessarily on the positioning neighbor list, if it is not possible to receive radio signals from that BTS. Thus the positioning neighbor list for each BTS comprises selected BTS's that are geographically suitable for determining a TA value, but do not have to meet the restrictions for being on the handover candidate list (for example, maximum TA restrictions, broadcast control channel quality restrictions, etc.). An example of a positioning neighbor list for the BTS's controlled by BSC 32 is shown in Table 1.

TABLE 1

| BTS | POSITIONING NEIGHBORS | | | |
|---|---|---|---|---|
| 50 | 52 | 64 | | |
| 52 | 54 | 60 | 64 | |
| 54 | 52 | 56 | 60 | |
| 56 | 58 | 60 | | |
| 58 | 56 | 60 | 54 | 62 |
| 60 | 58 | 54 | 56 | 52 |
| 62 | 60 | 58 | 64 | |
| 64 | 50 | 62 | 60 | 52 |

The positioning neighbor list is used to find positioning neighbors of BTS's on the handover candidate list The handover candidate list is again examined, advantageously from the most suitable BTS to least suitable BTS. The BTS on the handover candidate list is used to select the positioning neighbor list. For each BTS on the handover candidate list, the positioning neighbors for that BTS are reviewed to determine if there is a positioning neighbor that can obtain a TA value for mobile station 150.

In this example, BTS 56 is the first BTS n the handover candidate list. The positioning neighbor list for BTS 56 includes BTS's 58 and 60. BTS 58 was previously selected, and is not selected again. BTS 60 is cosited with a previously selected BTS (BTS 58) and cannot be selected. BTS's 102, 98 and 100 are again unsuitable for selecting a positioning neighbor list, because they are not connected to BSC 32. BTS 58 is the next BTS on the handover candidate list. The positioning neighbor list for BTS 58 includes BTS's 56, 60, 54 and 62. BTS 56 was previously selected, and is not selected again. BTS 60 is cosited with BTS 58 and therefore not appropriate. BTS 54 is geographically near to BTS 58 and is not cosited with either previously selected BTS. Therefore, BTS 54 is selected to obtain a TA value for mobile station 150. The TA values of the signal between mobile station 150 and three BTS's are thus obtained and delivered to BSC 32. BSC 32 sends the identification of the BTS's and their respective TA values through MSC 14 to MPC 120, which makes the location calculations. Thus, a position determination may be made even if there are inadequate number of usable BTS's on the handover candidate list.

Figure 2:
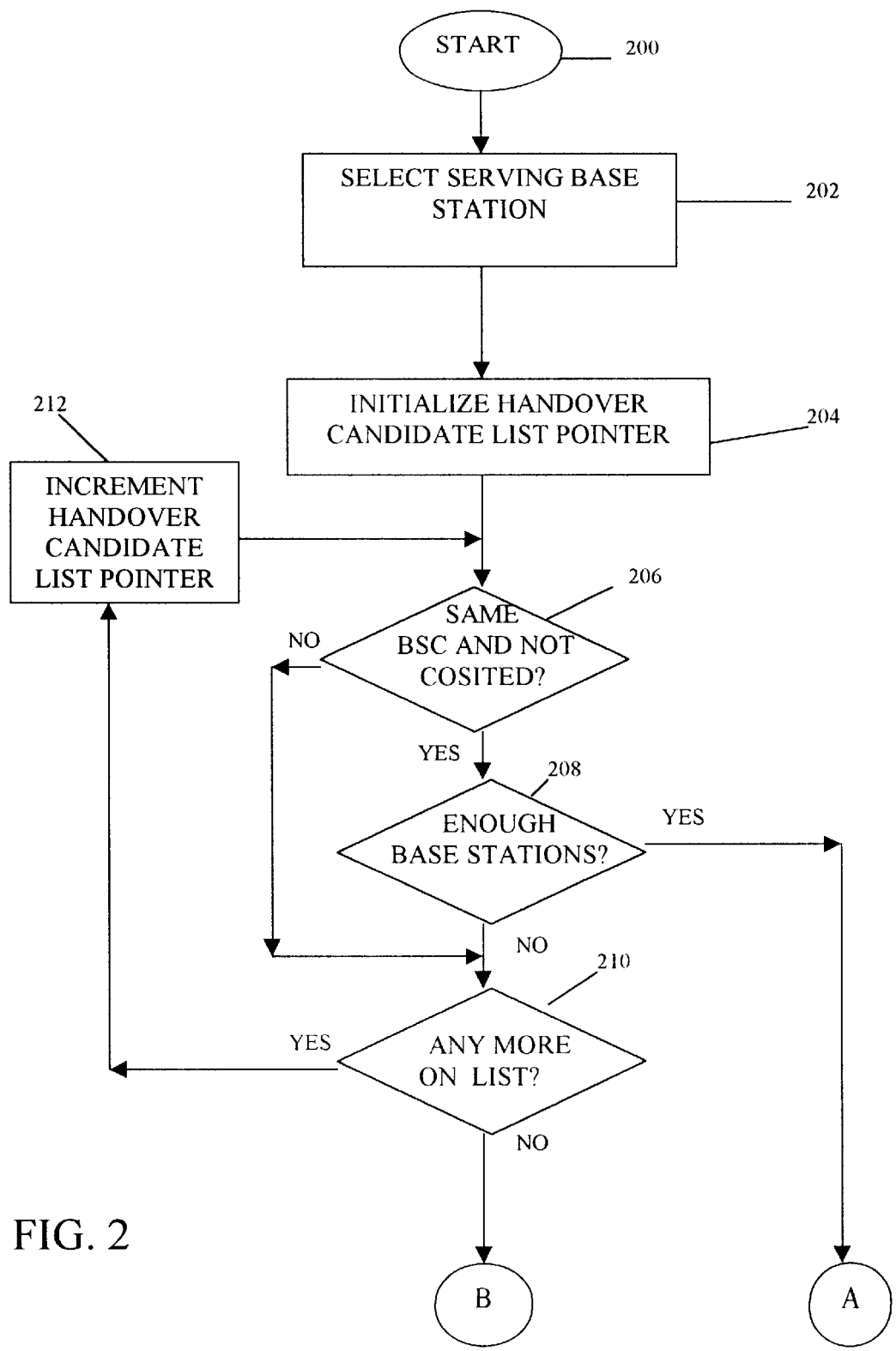
FIGS. 2 and 3 are flowcharts illustrating the method for selecting BTS's to make distance measurements in order to make a location determination of a mobile station.

FIG. 2 is a flow chart illustrating the method for selecting BTS's for obtaining TA values in order to make a location determination of a mobile station. The flow chart starts in circle 200 and moves to action box 202. In action box 202 the serving BTS is selected as one of the BTS's from which a TA value is obtained. Processing continues to action box 204 where a pointer to the mobile station's handover candidate list is initialized. Advantageously, the handover candidate list is examined from most suitable BTS to least suitable BTS. Processing proceeds to decision diamond 206 where a determination is made whether the BTS indicate by the pointer is not cosited with the serving BTS and is connected to the same BSC as the serving BTS. If the indicated BTS meets these determinations, the BTS is selected and processing proceeds to decision diamond 208. In decision diamond 208, a determination is made if sufficient BTS's have been selected. A minimum of three BTS's is selected; and four or more may be selected for increased accuracy. If, in decision diamond 208, a determination is made that there is a sufficient number of BTS's, processing proceeds through connector A to FIG. 3.

If a determination is made in decision diamond 208 that there are not sufficient BTS's selected, processing proceeds to decision diamond 210 where a determination is made if there are any more BTS's on the handover candidate list. If there are more BTS's on the handover candidate list, then processing proceeds to action box 212 where the handover candidate list pointer is incremented and processing continues back to decision diamond 206. If there are not, processing proceeds through connector B to FIG. 3.

Figure 3:
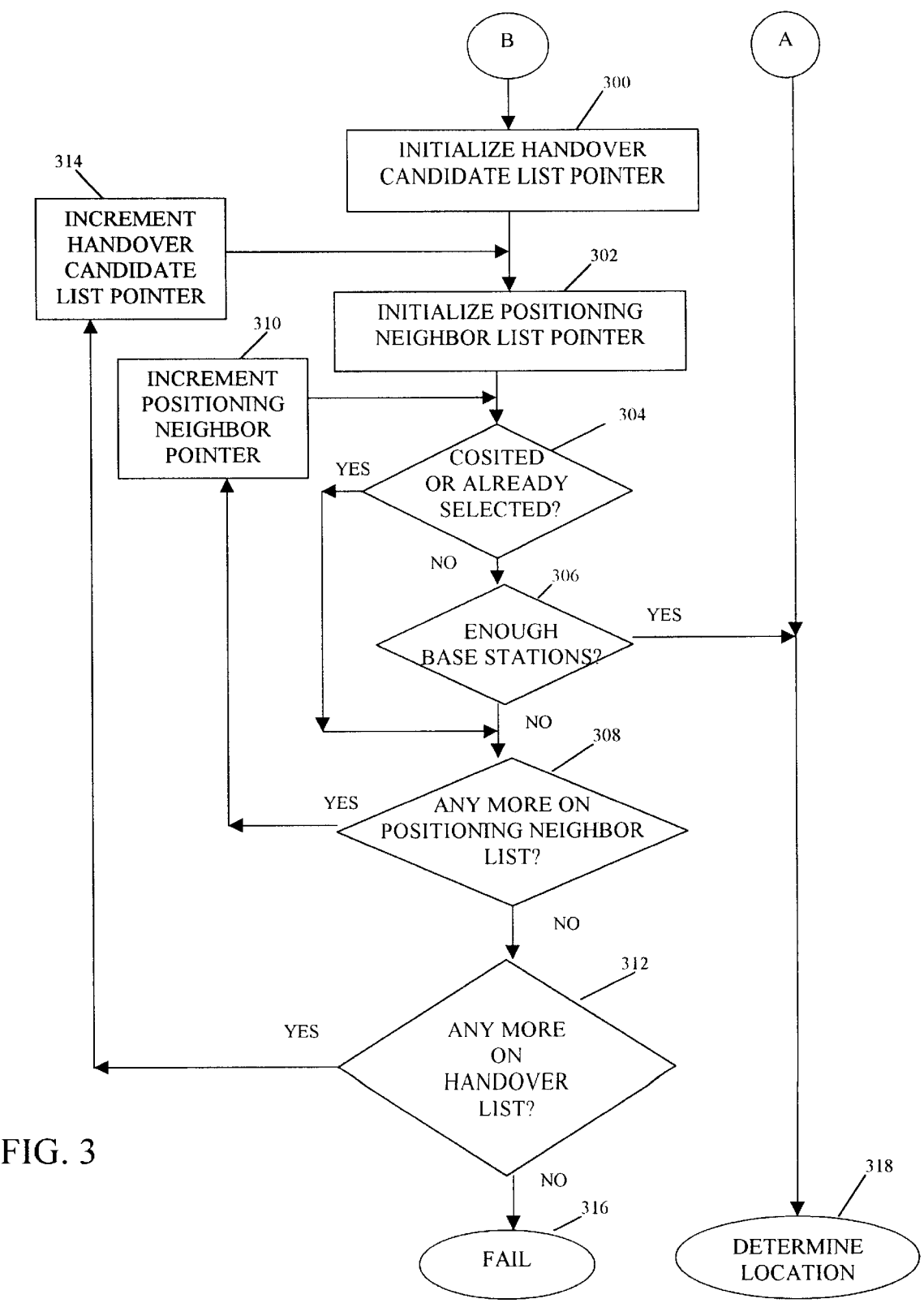

Continuing to FIG. 3, processing arriving through connector B proceeds to action box 300, where the pointer to the handover candidate list is initialized. Processing continues to action box 302, where the positioning neighbor list pointer is initialized. Next, a determination is made in decision diamond 304 whether the indicated BTS on the positioning neighbor list is cosited with a previously selected BTS. If a BTS on the positioning neighbor list is not cosited with a previously selected BTS, then processing proceeds to decision diamond 306 where a determination is made if a sufficient number of BTS's has been selected. If there are insufficient BTS's, then processing proceeds to decision diamond 308. In decision diamond 308, a determination is made whether there are more entries in the BTS handover candidate's positioning neighbor list. If there are, then processing proceeds to action box 310, where the pointer into the positioning neighbor list is incremented. Processing loops back to decision diamond 304.

If, in decision diamond 308, there are no further BTS's in the handover candidate list, then processing continues to decision diamond 312, where a determination is made whether there are further handover candidates. If there are, processing continues to action box 314 where the pointer into the handover candidate list is incremented. Processing loops back to action box 302 where the position neighbor list for the next handover candidate is examined.

If, in decision diamond 312, there are no more BTS's on the handover candidate list, processing proceeds to oval 316 where failure is reported. If, in decision diamond 306, enough BTS's have been selected, or if processing arrives through connector A, the TA values are collected by the BSC and delivered to MPC 120 via MSC 14. The location determination is made in oval 318.

It is to be understood that the above-described embodiment is to illustrate the principles of this invention, and that those skilled in the art may devise many variations without departing from the scope of the invention. It is, therefore, intended that such variations be included within the scope of the appended claims.

What is claimed is:

1. In a wireless network having a plurality of base transceiver stations for transmitting and receiving radio signals to and from a mobile station which is communicating with a serving base transceiver station and has developed a handover candidate list of ones of said plurality of base transceiver stations, the network having for each base transceiver station a list of positioning neighbor base transceiver stations, the method of selecting base transceiver stations for obtaining timing advance values of said mobile station with respect to a plurality of base transceiver stations, which comprises:

first, selecting said serving base transceiver station;

eliminating from the handover candidate and the positioning neighbor lists of base transceiver stations considered for selection those base transceiver stations with a base station controller different from that of the serving base station transceiver;

next, selecting one or more base transeiver stations from said handover candidate list; and then, selecting one or more base transceiver stations from said positioning neighbor list.

2. In a wireless network having a plurality of base transceiver stations for transmitting and receiving radio signals to and from a mobile station which is communicating with a serving base transceiver station and has developed a handover candidate list of ones of said plurality of base transceiver stations, the network having for each base transceiver station a list of positioning neighbor base transceiver stations, the method of selecting base transceiver stations for obtaining timing advance values of said mobile station with respect to a plurality of base transceiver stations, which comprises:

first, selecting said serving base transceiver station;

next, selecting one or more base transceiver stations from said handover candidate list;

then, selecting one or more base transceiver stations from said positioning neighbor list; and eliminating from consideration any base transceiver station cosited with a base transceiver station already selected.

* * * * *